(12) United States Patent
Haren et al.

(10) Patent No.: US 8,634,188 B2
(45) Date of Patent: Jan. 21, 2014

(54) NOTEBOOK COMPUTER DOCKING STATIONS (75) Inventors: Edgar Diego Haren, Houston, TX (US); Ann J Lai, Houston, TX (US); Kevin L Massaro, Houston, TX (US); Mark David Senatori, The Woodlands, TX (US); Ricardo Marquez, Houston, TX (US); David Gough, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 305 days.

(21) Appl. No.: 12/993,560

(22) PCT Filed: May 19, 2008

(86) PCT No.: PCT/US2008/064114
§ 371 (c)(1),
(2), (4) Date: Nov. 19, 2010

(87) PCT Pub. No.: WO2009/142619
PCT Pub. Date: Nov. 26, 2009

(65) Prior Publication Data
US 2011/0069445 A1 Mar. 24, 2011

(51) Int. Cl.
*G06F 1/16* (2006.01)
*H05K 5/00* (2006.01)
*H05K 7/00* (2006.01)

(52) U.S. Cl.
USPC ............ 361/679.41; 361/679.42; 361/679.43; 361/679.44

(58) Field of Classification Search
USPC ................. 361/679.41–679.44; 248/917–923
See application file for complete search history.

(56) References Cited

U.S. PATENT DOCUMENTS

| 5,630,566 | A | * | 5/1997 | Case ......................... 248/122.1 |
| 5,822,185 | A | * | 10/1998 | Cavello .................... 361/679.42 |
| 6,012,693 | A | * | 1/2000 | Voeller et al. ............ 248/280.11 |
| 6,021,985 | A | * | 2/2000 | Hahn ........................ 248/286.1 |
| 6,185,096 | B1 | * | 2/2001 | Helot et al. .............. 361/679.44 |
| 6,478,275 | B1 | * | 11/2002 | Huang ....................... 248/284.1 |
| 6,556,435 | B1 | * | 4/2003 | Helot et al. .............. 361/679.45 |
| 6,695,274 | B1 | * | 2/2004 | Chiu ............................ 248/371 |
| 6,825,415 | B1 | * | 11/2004 | Chen et al. ...................... 174/63 |
| 7,061,753 | B2 | * | 6/2006 | Michoux et al. ......... 361/679.05 |
| 7,338,023 | B2 | * | 3/2008 | Liu ............................ 248/284.1 |
| 7,433,185 | B1 | * | 10/2008 | Curran et al. ............ 361/679.41 |
| 7,546,994 | B2 | * | 6/2009 | Altonji et al. ............. 248/276.1 |
| 7,940,522 | B2 | * | 5/2011 | Solomon et al. ......... 361/679.41 |
| 2002/0017595 | A1 | * | 2/2002 | Koyanagi .................. 248/122.1 |
| 2003/0223185 | A1 | * | 12/2003 | Doczy et al. ................. 361/680 |
| 2005/0213298 | A1 | * | 9/2005 | Doherty et al. ............... 361/683 |

(Continued)

OTHER PUBLICATIONS

International Searching Authority, International Search Report and Written Opinion dated Feb. 5, 2009, pp. 12.

(Continued)

*Primary Examiner* — Jinhee Lee
*Assistant Examiner* — Abhishek Rathod (57) ABSTRACT

A docking station for supporting a notebook computer. In one embodiment, an docking station includes a base, a platform on which the notebook computer can be placed, and a platform support armature that extends up from the base and supports the platform, wherein the armature can be pivoted to change the height of the platform and the platform can be pivoted independent of the armature to change an angle of inclination of the platform.

18 Claims, 10 Drawing Sheets

(56) References Cited

U.S. PATENT DOCUMENTS

| | | | |
|---|---|---|---|
| 2006/0044752 A1* | 3/2006 | Lin et al. | 361/686 |
| 2006/0061958 A1* | 3/2006 | Solomon et al. | 361/686 |
| 2006/0238962 A1* | 10/2006 | Son et al. | 361/679 |
| 2006/0279920 A1* | 12/2006 | Lee et al. | 361/683 |
| 2007/0119025 A1* | 5/2007 | Hu | 16/340 |
| 2007/0136995 A1* | 6/2007 | Hu et al. | 16/340 |
| 2008/0007901 A1* | 1/2008 | Han et al. | 361/679 |
| 2008/0024975 A1* | 1/2008 | Huang et al. | 361/686 |
| 2009/0122482 A1* | 5/2009 | Solomon et al. | 361/679.55 |

OTHER PUBLICATIONS

Intellectual Property Office, Examination Report under Section 18(3), Appln No. GB1019582.4, date of mailing Feb. 8, 2012, 4 p.

* cited by examiner

NOTEBOOK COMPUTER DOCKING STATIONS

BACKGROUND

Many computer users choose to use a notebook computer in lieu of a desktop computer. In such cases, the computer can not only be used in a single location, such as within an office or home, but further can be transported from place to place along with the user. Although the portability of notebook computers is attractive, some consider it less attractive to have to input information using the notebook computer keyboard, either because of the size and configuration of the keyboard or because of its position, and therefore the user's position, relative to the notebook computer display. Because of that, several notebook computer users opt to use a docking station at the office or in the home that supports the notebook computer and its display above the desktop. When a docking station is used, a separate keyboard is typically used on which the user may type.

One challenge in designing a docking station is enabling the docking station, and therefore the supported notebook computer and its display, to be positioned in the many different orientations that may be desired by different users. Another challenge is to provide a simple and convenient means for the user to adjust the docking station and move it between those orientations. A further challenge is to support a variety of different notebook computers having different weights while still enabling simple and convenient repositioning. orientations. A further challenge is to support a variety of different notebook computers having various different weights while still enabling simple and convenient repositioning.

BRIEF DESCRIPTION OF THE DRAWINGS

The disclosed docking stations can be better understood with reference to the following drawings. The components in the drawings are not necessarily to scale.

DETAILED DESCRIPTION

Disclosed herein are docking stations configured to support a variety notebook computers in a variety of different orientations. In some embodiments, the docking station comprises a base from which extends an armature that supports a platform upon which a notebook computer can be placed. The orientation of the armature, and therefore the orientation of the platform and the notebook computer that it supports, can be adjusted by a user so that a display of the notebook computer can be placed in a position desired by the user. In some embodiments, the armature comprises pivotable front and rear members that are maintained in a relative parallel orientation by top and bottom brackets, and a platform support plate that is pivotally mounted to the top bracket. In such a case, the front and rear members can be pivoted to raise or lower the armature and the platform support plate can be pivoted to incline or decline the platform.

Figure 1:
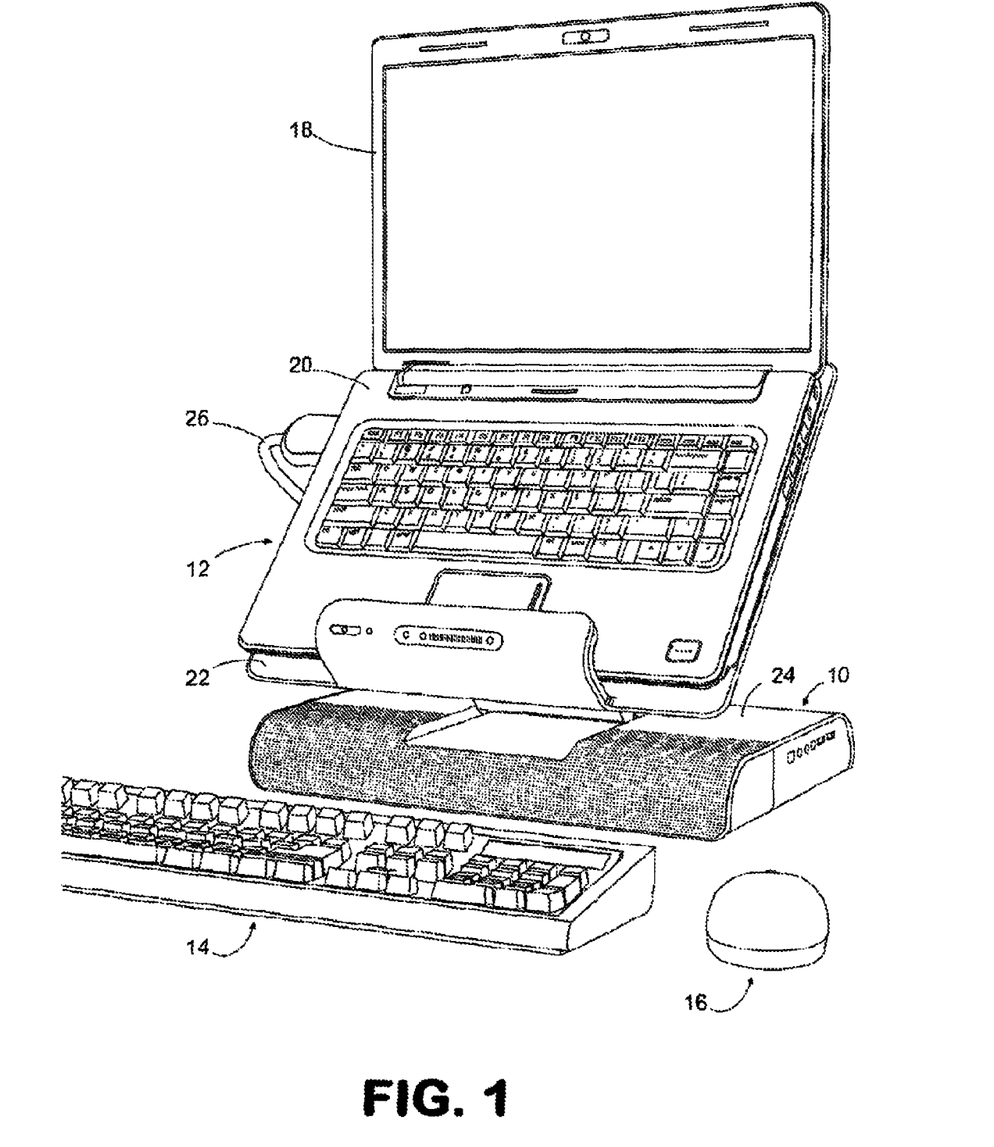
FIG. 1 is a front perspective view of a notebook computer supported by an embodiment of a docking station.

Referring now in more detail to the drawings, in which like numerals identify corresponding parts throughout the views. FIG. 1 illustrates a docking station 10 in use supporting a notebook computer 12. Also shown in FIG. 1 are an independent keyboard 14 and mouse 16 that can be used as input devices for the notebook computer 12. The notebook computer 12 includes a display 18 that is pivotally mounted to a base 20. The base 20 of the notebook computer 12 is supported by a platform 22 of the docking station 10. The platform 22 is supported by a platform support armature (see FIG. 3) that extends upward from a base 24 of the docking station 10. Extending between the platform 22 and the notebook computer 12 is a power cable 26.

Figure 2:
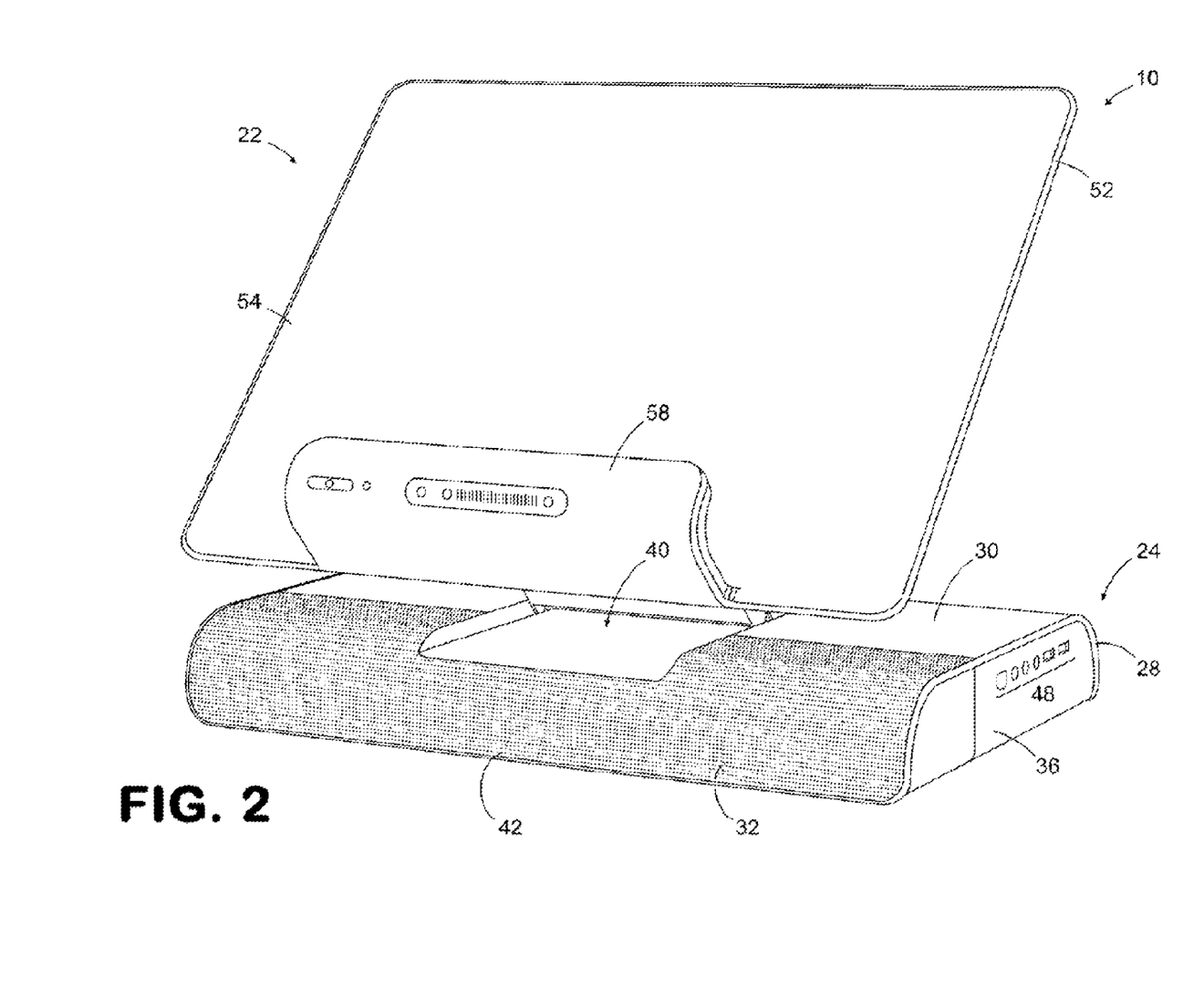
FIG. 2 is a front perspective view of the docking station shown in FIG. 1.
Figure 3:
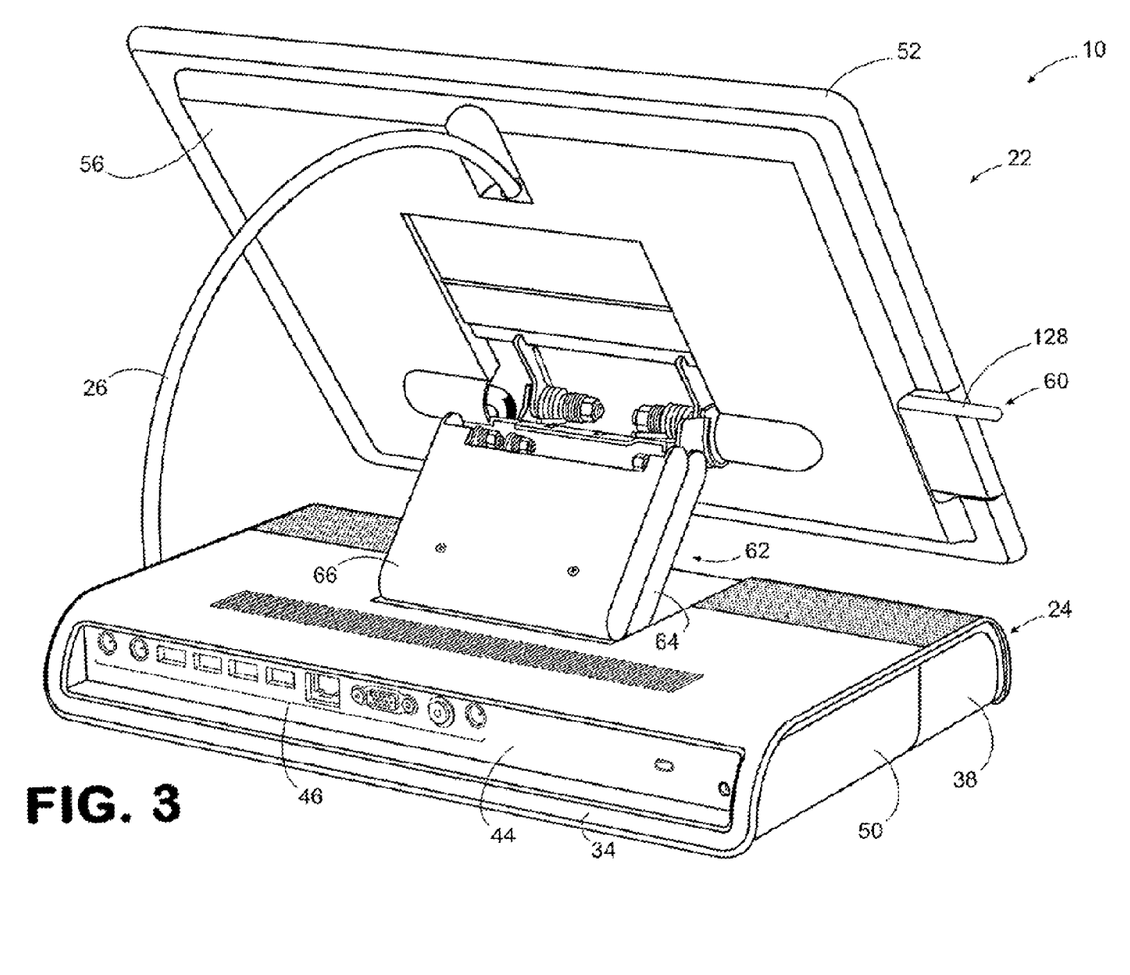
FIG. 3 is a rear perspective view of the docking station shown in FIG. 1.

FIGS. 2 and 3 illustrate the docking station 10 independent of a notebook computer. As indicated in those figures, the base 24 comprises an outer housing 28 that forms a top side 30, a front side 32, a rear side 34, and right and left sides 36 and 38. In the illustrated embodiment, the top side 30 includes a recess 40 that provides space for the platform support armature (see FIG. 3). The front side 32 includes a grill 40 through which sound may pass, and the rear side includes a connector panel 44 that comprises a plurality of connector ports 46. The right side 36 includes further connector ports 48, and the left side 38 comprises a removable module 50. The outer housing 28 further defines an interior space of the docking station 10 and can house various internal electronic components, including, for example, a storage device (e.g., a magnetic or optical drive) and audio equipment (e.g., an amplifier and speakers). Accordingly, the docking station 10 can be used for more than simply physically supporting a notebook computer in a desired orientation.

The platform 22 also comprises an outer housing 52. That housing 52 includes a front panel 54 and a rear panel 56 that are joined together to form an interior space between them. Integrated with the front panel 54 is a retaining bracket 58 that extends out from the panel to retain a notebook computer on the platform 22 when the platform is inclined, as depicted in FIG. 1. As shown in FIG. 3, the platform 22 encompasses a pivot lock mechanism 60, which is described in greater detail below.

Also shown in FIG. 3 is a platform support armature 62 that extends up from the base 24 to the platform 22 and, therefore, supports the platform above the base. The armature 62 is described in greater detail below in relation to FIGS. 5-8. As can be viewed in FIG. 3, however, the armature 62 includes aesthetic exterior covers 64 and 66 that conceal the internal components of the armature. In use, the armature 62 enables the platform 22 to be placed in various different orientations. In particular, due to the armature 62, the platform 22 can be both raised and lowered to increase or decrease its height, and pivoted forward or rearward to increase or decrease its inclination.

Figure 4A:
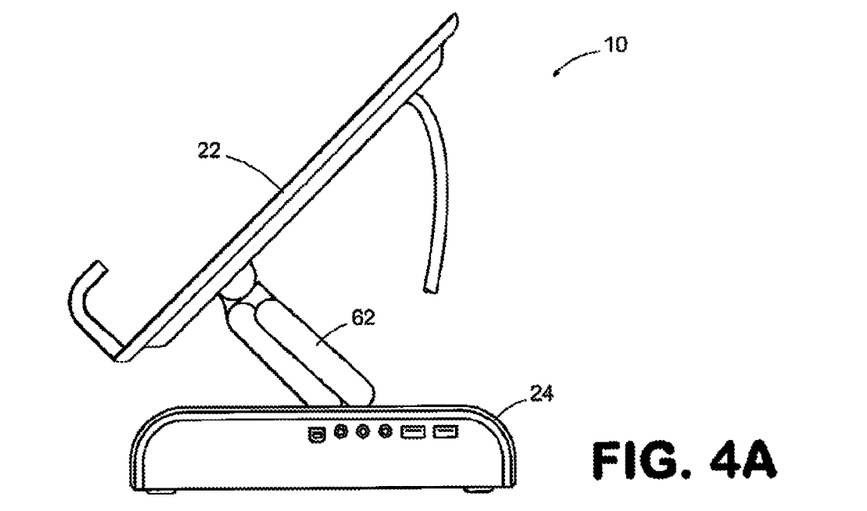
FIGS. 4A-4C are side views of the docking station shown in FIG. 1, illustrating example orientations in which a platform of the docketing station can be placed.
Figure 4B:
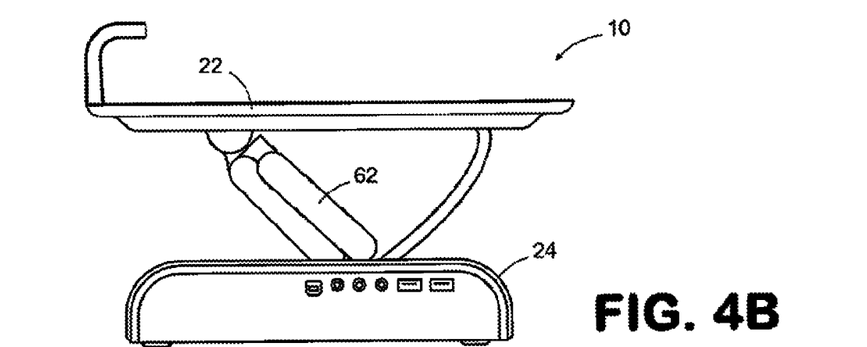
Figure 4C:
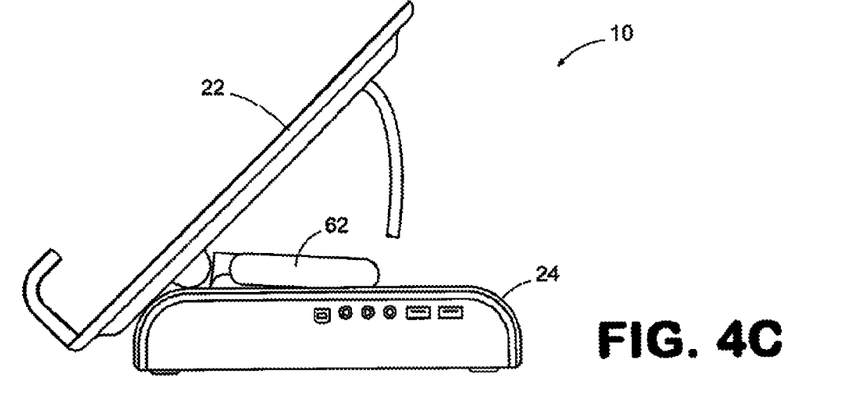

FIGS. 4A-4C provide an indication of the manner in which the platform 22 can be manipulated. Beginning with FIG. 4A, the platform 22 is shown in an initial orientation. In that orientation, the armature 62 is in a fully extended position such that the platform 22 is raised to a maximum height above the base 24. As is apparent in FIG. 4A, the armature 62 forms an approximately 45 degree angle with the base 24 in that position. As is further apparent in FIG. 4A, the platform 22 is in a fully inclined position such that the platform forms an approximately 45 degree angle with a horizontal plane (e.g., the plane of a desk or table on which the docking station 10 is placed).

Referring next to FIG. 4B, the platform 22 has been pivoted rearward from its initial position shown in FIG. 4A to reduce its angle of inclination. In particular, the platform 22 has been pivoted to a fully declined position in which it is substantially parallel with the horizontal plane. In FIG. 4C, the platform 22 has not been pivoted from its initial position shown in FIG. 4A. Instead, the platform support armature 62 has been pivoted forward and download to a fully retracted position so as to lower the platform 22 from its initial position. As can be appreciated from FIGS. 4A-4C, the angle of inclination of the platform 22 and the orientation of the armature 62 are separately adjustable and independent of each other. Therefore, pivoting of the platform 22 does not affect the orientation of the armature 62 (FIG. 4B) and pivoting of the armature does not affect the inclination of the platform (FIG. 4C). The components of the armature 62 that enable such manipulations are described below in relation to FIGS. 5-8.

Figure 5:
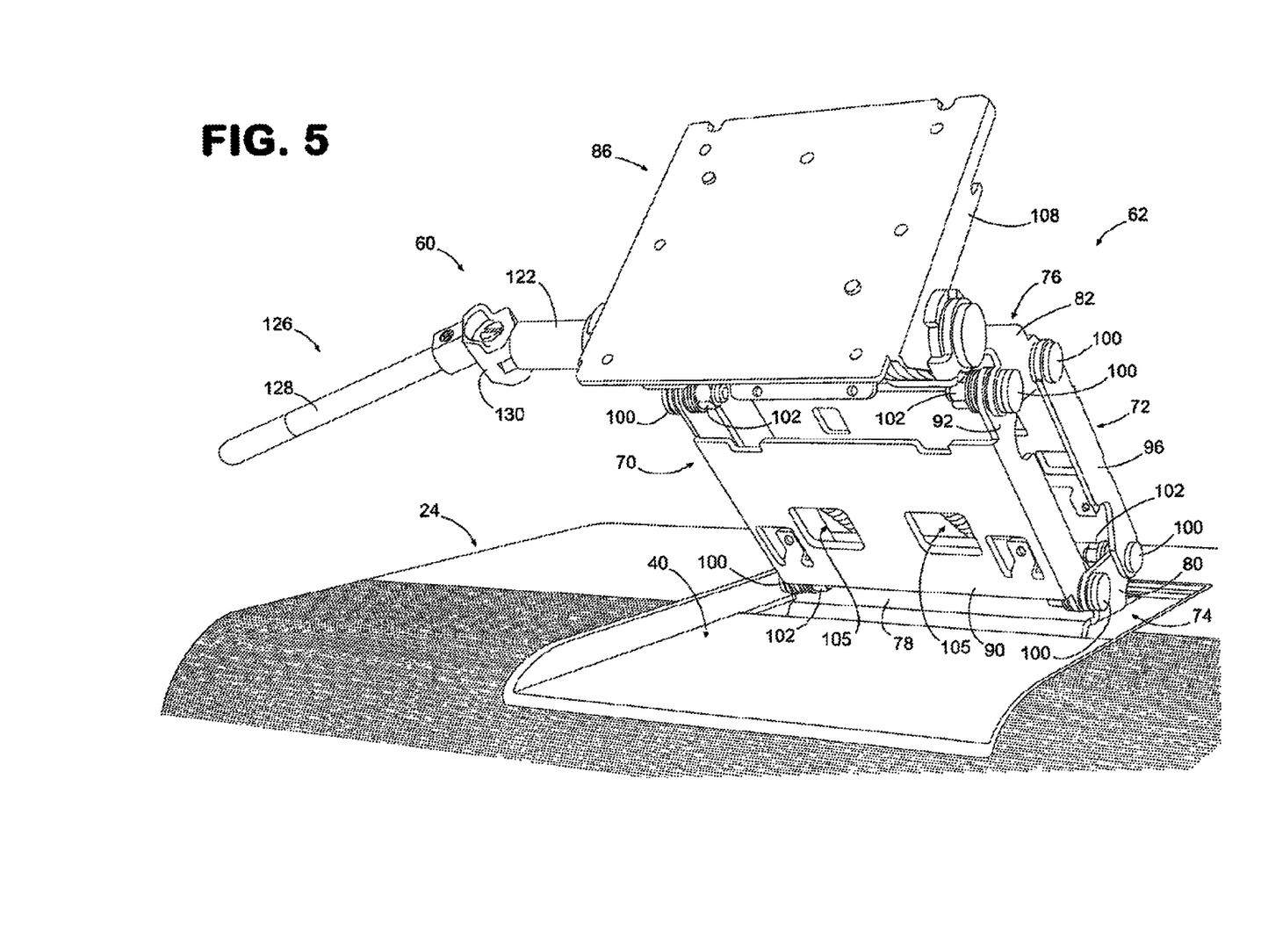
FIG. 5 is a front perspective view of an embodiment of an armature of the docking station shown in FIG. 1.
Figure 6:
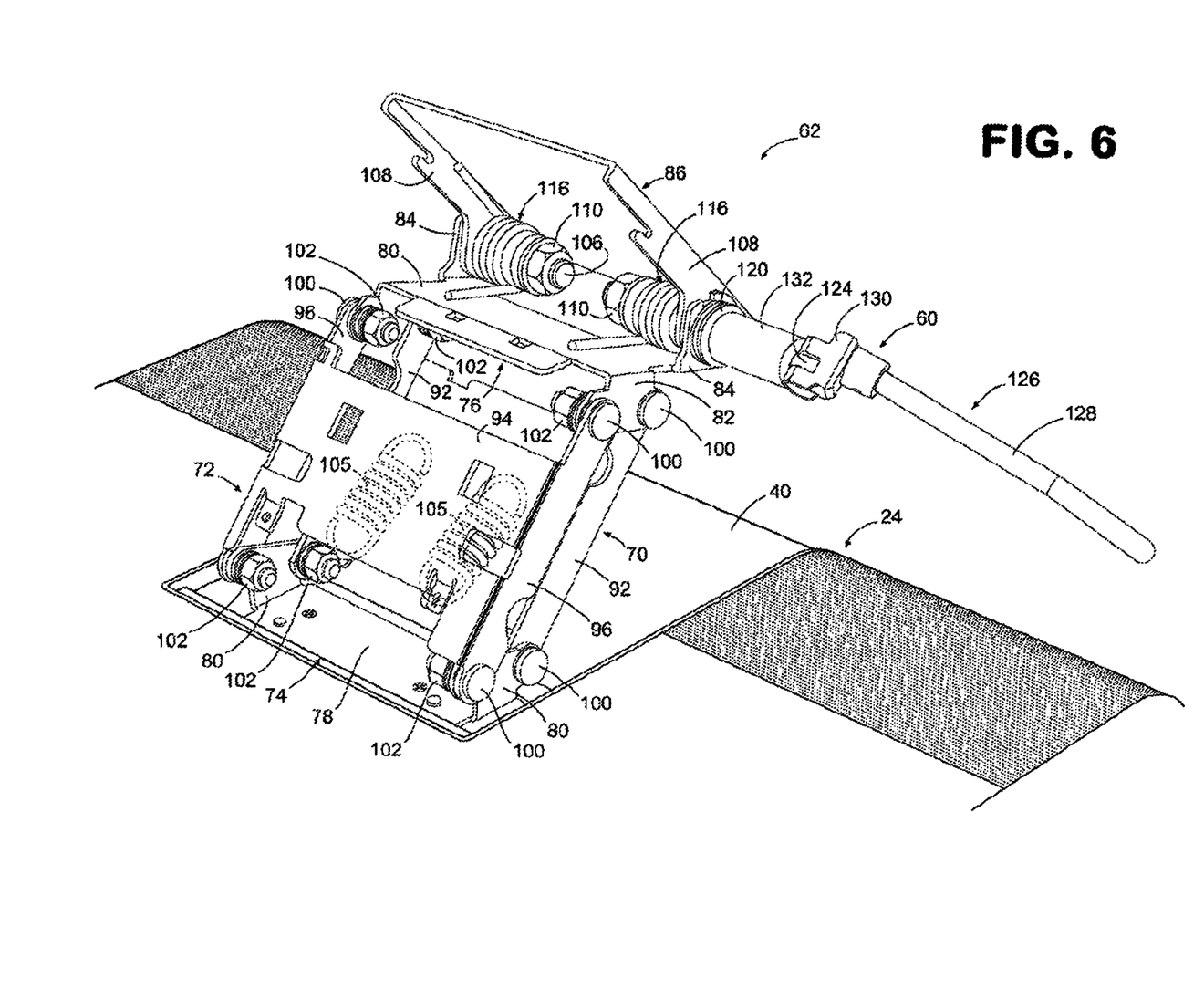
FIG. 6 is a rear perspective view of the armature of FIG. 5.

FIGS. 5-8 illustrate the platform support armature 62 with its covers 64, 66 (FIG. 3) and the platform 22 removed. With reference first to FIGS. 5 and 6, the armature 62 includes a first or front member 70 and a second or rear member 72 that are both pivotally connected to a first or bottom bracket 74 and a second or top bracket 76. The bottom bracket 74 is securely mounted to the base 24 of the docking station 10 and, therefore, secures the armature 62 relative to base. As shown most clearly in FIG. 6, the bottom bracket 74 includes a body 78 from which upwardly extend connection tabs 80 to which the front and rear members 70, 72 are pivotally connected. In some embodiments, the bottom bracket 74 can be formed from a single piece of stamped metal, such as steel. As is also shown in FIG. 6, the top bracket 76 comprises a body 80 from which downwardly extend connection tabs 82 to which the front and rear members 70, 72 are pivotally connected. In addition, the top bracket 76 includes upwardly extending connection tabs 84 to which a platform support plate 86, to which the platform 22 can mount, is pivotally mounted. Like the bottom bracket 74, the top bracket 76 can, in some embodiments, be formed from a single piece of stamped metal, such as steel.

With reference to FIG. 5, the front member 70 comprises a body 90 and lateral connection tabs 92 that extend out from the body to enable connection of the front member to the bottom and top brackets 74, 76. As shown in FIG. 6, the rear member 72 also comprises a body 94 and lateral connection tabs 96 that extend out from the body to enable connection of the rear member to the bottom and top brackets 74, 76. In some embodiments, both the front and the rear members 70, 72 can be formed from a single piece of stamped metal, such as steel. As is apparent from both FIGS. 5 and 6, the front and rear members 70, 72 are generally parallel to each other. Notably, that parallel relationship is maintained between the front and rear members 70, 72 throughout their range of motion and irrespective of the position the platform support armature 62 is placed.

Figure 8:
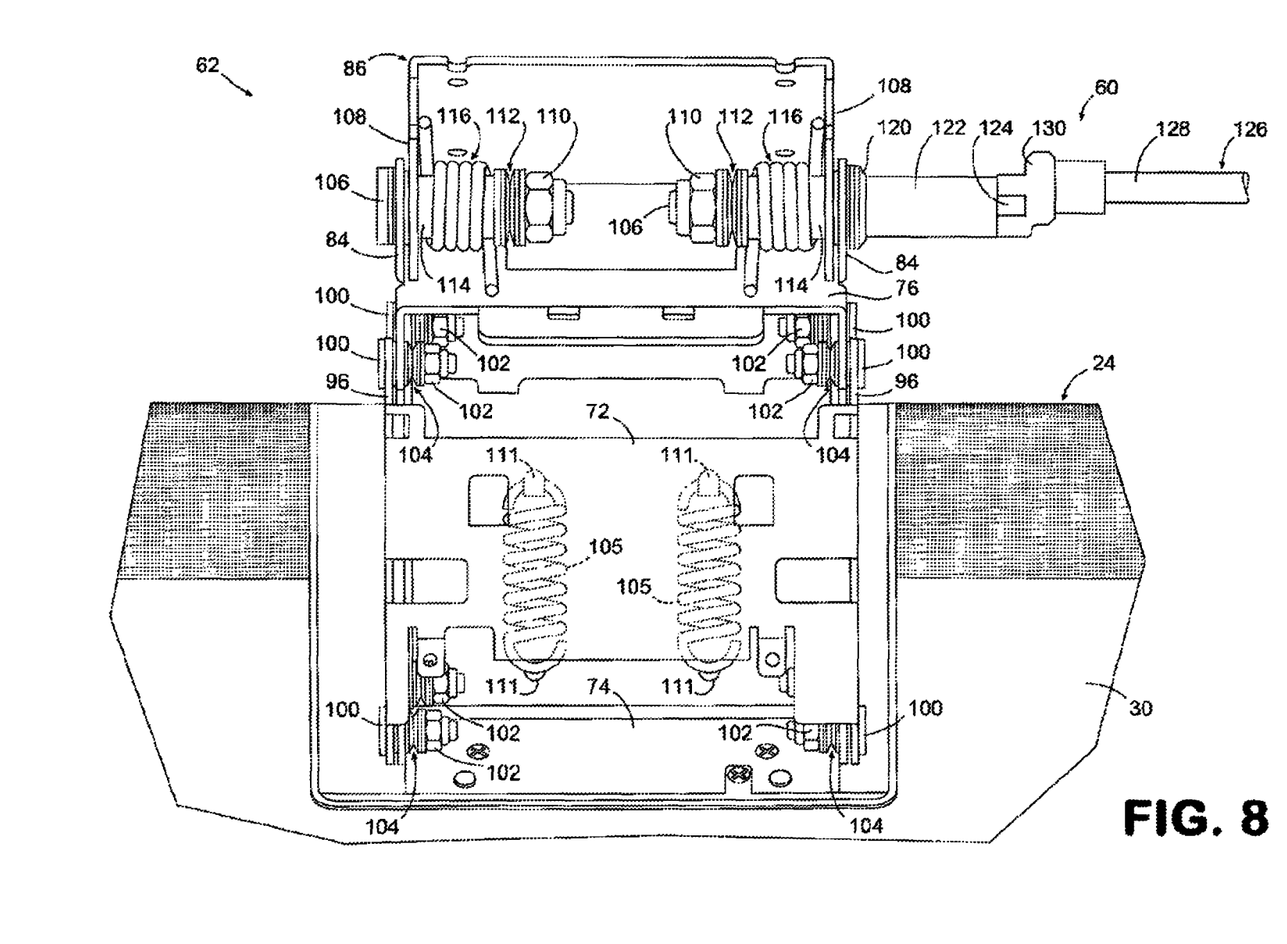
FIG. 8 is a rear view of the armature of FIG. 5.

The front and rear members 70, 72 of the platform support armature 62 are connected to the bottom and top brackets 74, 76 with a plurality of fasteners 100 that extend through openings (not shown) provided through the connection tabs 80, 82, 92, 96. Accordingly, the fasteners 100 define pivot axes about which the front and rear members 70, 72 can be pivoted. In some embodiments, the fasteners 100 comprise threaded fasteners that are secured in place with lock nuts 102. Optionally, the fasteners 100 comprise flat surfaces (not shown) that extend along their lengths and through their threads that are adapted to mate with flat surfaces (not shown) of selected openings of the connection tabs 80, 82, 92, 96 so as to prevent rotation of the fasteners within their respective openings. With reference to FIG. 8, the lock nuts 102 can be tightened against washers 104 provided on each fastener 100. In some embodiments, the washers 104 include cupped spring or "Belleville" washers that acts as compression springs. In such a case, the lock nuts 102 can be tightened against the washers 104 so as to impart and control a desired degree of friction that opposes pivoting of the members 70, 72 relative to the brackets 74, 76.

Figure 7:
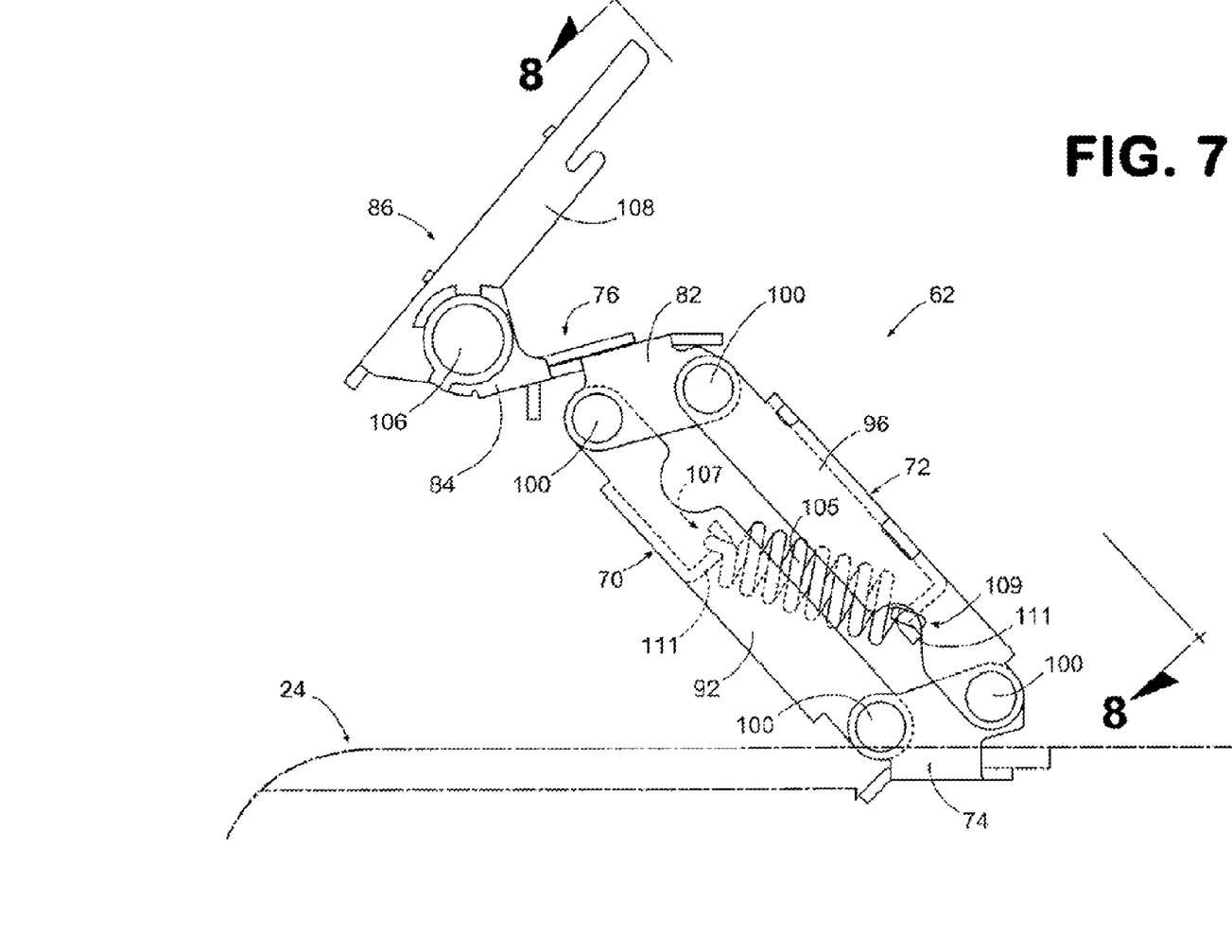
FIG. 7 is a side view of the armature of FIG. 5.

With specific reference to FIGS. 5-7, extending between the front and rear members 70, 72 of the platform support armature 62 are tension springs 105. As shown most clearly in FIG. 7, the springs 105 are attached at a first end 107 to the front member 70 and attached at a second end 109 to the rear member 72. By way of example, the springs 105 attach to inwardly extending tangs 111 that are created during the stamping process used to form the front and rear members 70, 72. Regardless, the springs 105 apply a pulling force between to the front and rear members 70, 72 that urges the armature 62 toward the upright position shown in FIG. 4A. Therefore, when the platform 22 of the docking station 10 is loaded with notebook computer, the springs 105 assist in supporting the weight of the notebook computer and, therefore, assist in maintaining the notebook computer in a desired position.

With reference again to FIG. 8, the platform support plate 86 is connected to the top bracket 76 with fasteners 106 that extend through openings (not shown) provided through the connection tabs 84 of the top bracket 76 and through connection tabs 108 of the support plate 86. In some embodiments, the fasteners 106 comprise threaded fasteners that are secured in place with lock nuts 110. Like the fasteners 100, the fasteners 106 and the openings through which they extend optionally comprise flat surfaces (not shown) that prevent rotation of the fasteners. With further reference to FIG. 8, the lock nuts 110 can be tightened against multiple washers 112 provided on each fastener 100. In some embodiments, the washers 112 also include cupped spring washers. In such a case, the lock nuts 110 can be tightened against the washers 112 so as to impart and control a desired degree of friction that opposes pivoting of the support plate 86 relative to top bracket 76.

As is further shown in FIG. 8, positioned on each fastener 106 between the connection tabs 108 of the platform support plate 86 and the washers 112 is a spacing collar 114. Disposed about each of the collars 114 is a torsion spring 116 that applies an expansion force to the support plate 86 that urges the support plate away from the top bracket 76. Accordingly, the springs 116 urge the support plate 86 toward an outwardly pivoted position associated with an increased angle of inclination for the platform 22. Therefore, when the platform 22 of the docking station 10 is loaded with notebook computer, the springs 116 assist in supporting the weight of the notebook computer and, therefore, assist in maintaining the notebook computer in a desired position.

With the construction described above, the platform support armature 62 can effectively support a notebook computer in a variety of different orientations. Specifically, the springs 105, 116 support or counterbalance the weight of the notebook computer while the friction provided by the fasteners 100, 106 and the lock nuts 102, 110 oppose pivoting of the front and rear members 70, 72 and the platform support plate 86 after adjustments have been made by the user. Due to the combination of the spring force and the pivot axis friction, notebook computers ranging from approximately 4 to 8 pounds can be supported in any desired orientation chosen by the user.

Figure 9A:
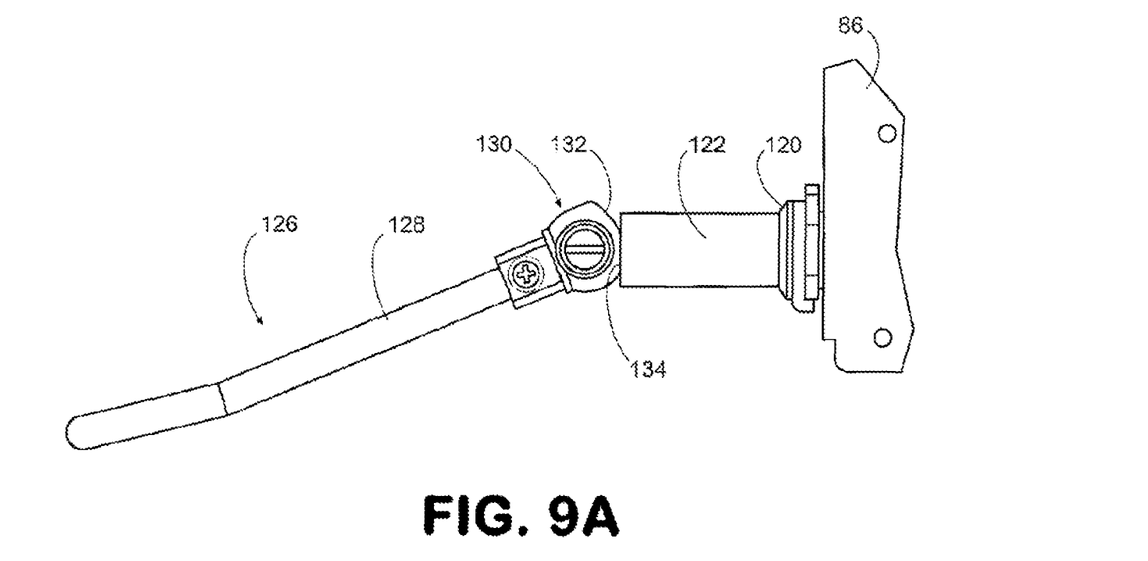
FIGS. 9A and 9B are top views of a lever of a pivot lock mechanism of the armature of FIG. 5, illustrating an unlocked and a locked position, respectively.
Figure 9B:
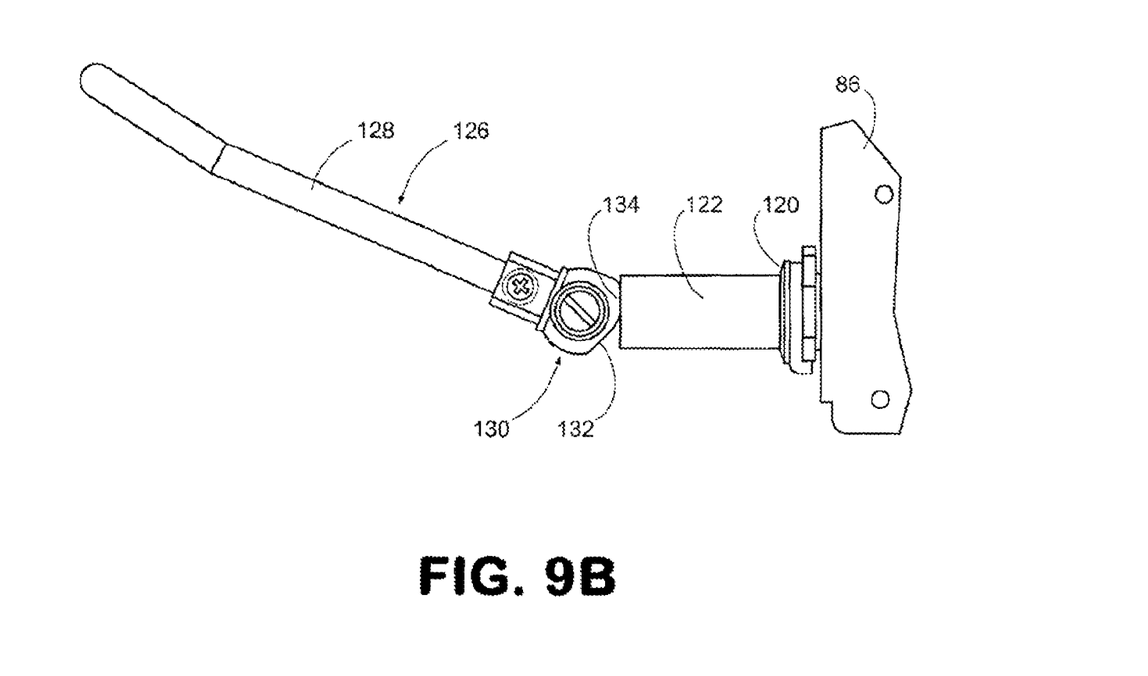

Continuing with FIG. 8, the pivot lock mechanism 60 introduced in relation to FIG. 3 can be used to ensure that the angle of inclination of the platform 22 is not accidentally changed when the user adjusts the height of the platform. As indicated in FIG. 8, the lock mechanism 60 is integrated with the pivot axis defined by the fastener 106 on the left side of the platform support armature 62 (on the right in the rear view of FIG. 8). In particular, the fastener 106 extends outward from the platform support plate 86 and the top bracket 76 through a further cupped spring washer 120 and a further spacing collar 122. Extending from the collar 122 is a coupling portion 124 of the fastener 106 to which a cam lever 126 is pivotally mounted. Referring to FIGS. 9A and 96, the cam lever 126 includes a lever arm 128 that extends out from a cam 130 that defines a cam surface 132. The cam surface 132 is placed in contact with an end surface 134 of the collar 122.

In FIG. 9A, a first face of the cam surface 132 is engaged with the end surface 134 of the spacing collar 122. In that position, the cam 130 applies a first amount of inward or squeezing force on the washers 112, 120 provided on the fastener 106, which results in a first amount of friction that opposes pivoting of the platform support plate 86. Under that first amount of friction, the support plate 86, and therefore the platform 22 it supports, can be intentionally pivoted by the user but generally will not otherwise pivot. When the cam lever 126 is pivoted by the user to the orientation shown in FIG. 9B, however, a second face of the cam surface 132 that is positioned farther from the pivot axis of the cam 130 engages the end surface 134 of the collar 122, thereby applying a greater inward or squeezing force on the washers 112, 120 so as to lock the platform support plate 86 and platform 22 in place.

Figure 10A:
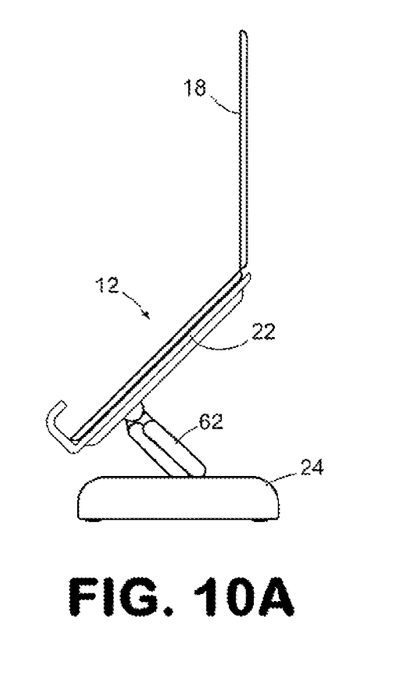
FIGS. 10A-10D are side views of the docking station shown in FIG. 1, illustrating an example range of orientations in which a notebook computer can be placed due to the provision of the armature of FIG. 5.
Figure 10B:
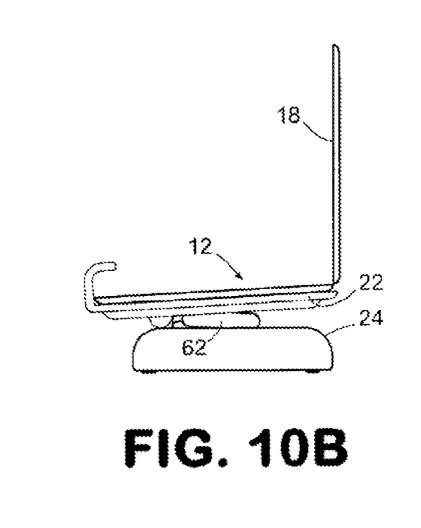
Figure 10C:
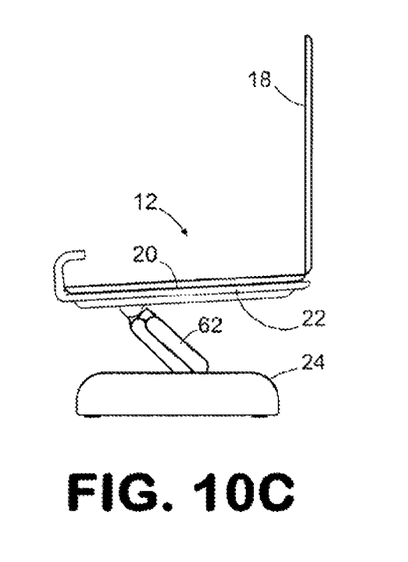
Figure 10D:
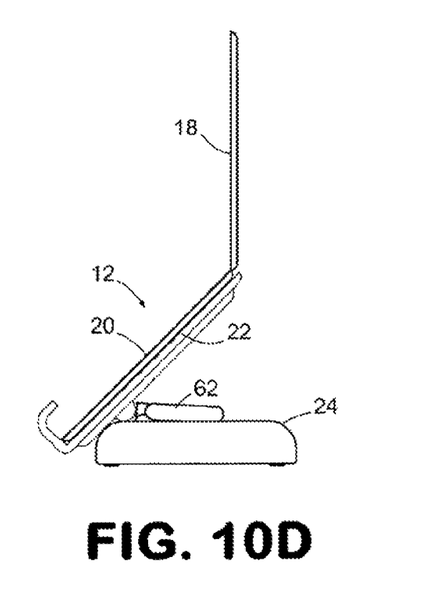

Through combined pivoting and raising or lowering of the platform 22, a notebook computer, and therefore its display, can be placed in a variety of orientations. FIGS. 10A-10B illustrate an example range of orientations in which the notebook computer 12 can be placed. Beginning with FIG. 10A, the platform support armature 62 (i.e., the front and rear members 70, 72) is placed in the fully extended position and the platform 22 is placed in the fully inclined position. In such a case, the display 18 of the notebook computer 12 is raised to a maximum height, which may be desirable to taller users. In FIG. 10B, the armature 62 is placed in the fully retracted position and the platform 22 is placed in the fully declined position. In such a case, the display 18 of the notebook computer 12 is lowered to a minimum height, which may be desirable to shorter users. In FIG. 10C, the armature 62 is placed in the fully extended position but the platform 22 is placed in the fully declined position. In such a case, the display 18 of the notebook computer 12 is raised to a first intermediate height. Finally, in FIG. 10D, the armature 62 is placed in the fully retracted position but the platform 22 is placed in the fully inclined position. In such a case, the display 18 of the notebook computer 12 is raised to a second intermediate height that is higher than the first intermediate height.

As can be appreciated from FIGS. 10A-10D, and the preceding disclosure in general, the platform support armature 62 can be used to position a notebook computer and its display in any one of a myriad of different orientations regardless of its weight. Equally important, each of those orientations can be achieved with relative ease due to the construction and operation of the armature 62.

Claimed are:

1. A docking station for supporting a notebook computer, the docking station comprising:
   a base;
   a platform on which the notebook computer can be placed; and
   a platform support armature that extends up from the base and supports the platform, the platform support armature comprises a front member and a rear member that are both pivotally connected to a bottom bracket and a top bracket, the bottom bracket being mounted to the base and a platform support plate being pivotally mounted to the top bracket, wherein the front and rear members are parallel to each other throughout their range of motion; and
   wherein the armature can be pivoted to change the height of the platform and the platform can pivoted independent of the armature to change an angle of inclination of the platform;
   a platform support plate that is pivotally mounted to a top bracket by a fastener; and a pivot lock mechanism extending from one side of the platform, the pivot lock mechanism to prevent unintended pivoting of the platform support plate, the pivot lock mechanism comprising a cam lever pivotally mounted to the fastener such that in a first position the cam lever applies first amount of pressure to cupped spring washers to create friction that opposes pivoting of the platform support plate to a first extent, and that, in a second position, applies a second amount of pressure on the cupped spring washers to create friction that opposes pivoting of the support plate to a greater extent.

2. The docking station of claim 1, wherein the base comprises an outer housing that defines an interior space in which is provided electronic components.

3. The docking station of claim 1, wherein the platform comprises a front panel on which the notebook computer rests and a retaining bracket that extends from the front surface that retains the notebook computer on the platform when the platform is inclined.

4. The docking station of claim 1, wherein the front and rear members are pivotally connected to the bottom bracket and the top bracket with threaded fasteners and lock nuts that impart friction that opposes unintended pivoting of the front and rear members.

5. The docking station of claim 4, further comprising cupped spring washers provided on the threaded fasteners against which the lock nuts are tightened.

6. The docking station of claim 1, further comprising tension springs that extend between the front and rear members that apply a pulling force that urges the armature toward an upright position.

7. The docking station of claim 1, wherein the platform support plate is pivotally connected to the top bracket with threaded fasteners and lock nuts that impart friction that opposes unintended pivoting of the support plate.

8. The docking station of claim 7, further comprising cupped spring washers provided on the threaded fasteners against which the lock nuts are tightened.

9. The docking station of claim 7, further comprising torsion springs that apply an expansion force to the platform support plate that urges the support plate away from the top bracket.

10. The docking station of claim 1, further comprising a spacer sliding on the fastener and interposed between the pivot lock mechanism and cupped spring washers on the fastener, in which the cam lever presses against the spacer to apply pressure to the cupped spring washers.

11. The docking station of claim 1, in which the cupped spring washers serve as compression springs and create friction against lock nuts that oppose pivoting of the platform support plate.

12. The docking station of claim 1, further comprising a torsion spring mounted on the fastener, in which the fastener does not pass completely through the top bracket.

13. The docking station of claim 1, wherein the platform comprises a front panel on which the notebook computer rests and a rear panel, in which the front panel and rear panel are joined to form an interior space and encompass the pivot lock mechanism.

14. The docking station of claim 1, in which an angle of inclination of the platform is not changed when a height of the platform is adjusted.

15. A docking station for supporting a notebook computer, the docking station comprising:

a base comprising an outer housing that defines an interior space;

a platform on which the notebook computer can be placed, the platform comprising a front panel on which the notebook computer rests and a retaining bracket that extends from the front surface that retains the notebook computer on the platform when the platform is inclined; and a platform support armature that extends up from the base and supports the platform, the armature comprising a front member and a rear member that are both pivotally connected to a bottom bracket and a top bracket, the bottom bracket being mounted to the base and a platform support plate being pivotally mounted to the top bracket, the platform being mounted to the support plate;

wherein the armature can be pivoted to change the height of the platform and the platform can be pivoted independent of the armature to change the angle of inclination of the platform and wherein the front and rear members are parallel to each other throughout their range of motion; and a pivot lock mechanism extending from one side of the platform, the pivot lock mechanism to prevent unintended pivoting of the platform support plate, the pivot lock mechanism comprising a cam lever pivotally mounted to the fastener such that in a first position the cam lever applies first amount of pressure to cupped spring washers to create friction that opposes pivoting of the platform support plate to a first extent, and that, in a second position, applies a second amount of pressure on the cupped spring washers to create friction that opposes pivoting of the support plate to a greater extent.

16. The docking station of claim 15, wherein the front and rear members are pivotally connected to the bottom bracket and the top bracket with threaded fasteners and lock nuts that impart friction that opposes unintended pivoting of the front and rear members, and wherein the platform support plate is pivotally connected to the top bracket with threaded fasteners and lock nuts that impart friction that opposes unintended pivoting of the support plate.

17. The docking station of claim 16, further comprising tension springs that extend between the front and rear members that apply a pulling force that urges the platform support armature toward an upright position and torsion springs that apply an expansion force to the platform support plate that urges the support plate away from the top bracket.

18. The docking station of claim 17, further comprises the pivot lock mechanism being integrated with one of the threaded fasteners that pivotally connect the platform support plate to the top bracket and including a cam that, in a first position, applies a first amount of friction that opposes pivoting of the platform support plate to a first extent, and that, in a second position, applies a second amount of friction that opposes pivoting of the support plate to a greater extent.

* * * * *

UNITED STATES PATENT AND TRADEMARK OFFICE
CERTIFICATE OF CORRECTION

PATENT NO.        : 8,634,188 B2                        Page 1 of 1
APPLICATION NO.   : 12/993560
DATED             : January 21, 2014
INVENTOR(S)       : Edgar Diego Haren et al.

It is certified that error appears in the above-identified patent and that said Letters Patent is hereby corrected as shown below:

In the Claims

In column 6, line 10, in Claim 1, after "placed;" delete "and".

In column 6, line 21, in Claim 1, after "can" insert -- be --.

Signed and Sealed this
Third Day of June, 2014

Michelle K. Lee
*Deputy Director of the United States Patent and Trademark Office*